US011912541B2

(12) United States Patent
Gebhardt

(10) Patent No.: US 11,912,541 B2
(45) Date of Patent: Feb. 27, 2024

(54) RAPID RECOVERY GRAPPLE

(71) Applicant: Search And Recovery Engineering LLC, Warrens, WI (US)

(72) Inventor: Nicholas Duane Gebhardt, Warrens, WI (US)

(73) Assignee: Search and Recovery Engineering LLC, Warrens, WI (US)

( * ) Notice: Subject to any disclaimer, the term of this patent is extended or adjusted under 35 U.S.C. 154(b) by 263 days.

(21) Appl. No.: 17/246,898

(22) Filed: May 3, 2021

(65) Prior Publication Data

US 2021/0347613 A1 Nov. 11, 2021

Related U.S. Application Data

(60) Provisional application No. 63/021,869, filed on May 8, 2020.

(51) Int. Cl.
*B66C 1/66* (2006.01)

(52) U.S. Cl.
CPC .................................... *B66C 1/66* (2013.01)

(58) Field of Classification Search
CPC .......... B66C 1/66; B66C 1/10; F16B 13/0808
USPC ....................................................... 294/66.1
See application file for complete search history.

(56) References Cited

U.S. PATENT DOCUMENTS

| | | | | | |
|---|---|---|---|---|---|
| 2,789,859 | A * | 4/1957 | Woellner | B66C 1/66 | 294/90 |
| 3,164,406 | A * | 1/1965 | Barry | B66C 1/34 | 294/81.51 |
| 4,079,655 | A * | 3/1978 | Roberson, Jr. | F16B 13/0808 | 411/344 |
| 4,447,085 | A * | 5/1984 | Schmid | B66C 1/66 | 414/753.1 |
| 5,582,662 | A * | 12/1996 | Pribysh | B60C 27/04 | 152/218 |
| 6,089,637 | A * | 7/2000 | Brunelle | B65G 7/12 | 294/158 |
| 2008/0080949 | A1* | 4/2008 | Deng | F16B 37/0821 | 411/342 |
| 2021/0267578 | A1* | 9/2021 | Rebellino | A61B 10/0283 | |

* cited by examiner

*Primary Examiner* — Lynn E Schwenning
(74) *Attorney, Agent, or Firm* — Boyle Fredrickson, S.C.

(57) ABSTRACT

A rapid recovery grapple is described. The rapid recover grapple can be used to quick and easily be secured to a vehicle or other item that is submerged in a body of water. The grapple is attached to a winch or other rope or line that can be used to remove the vehicle from the water. For instance, the grapple may be configured to be secured to a wheel or tire of a vehicle. The grapple may have a body and at least one finger that is rotatable relative to the body. For instance, the at least one finger may be first and second fingers rotatable relative to the body. The grapple may be equipped with a biasing member, such as a cord, spring, or other elastic member that automatically biases the at least one finger to a give position.

8 Claims, 8 Drawing Sheets

RAPID RECOVERY GRAPPLE

CROSS-REFERENCE(S) TO RELATED APPLICATION(S)

This application claims the benefit of priority on U.S. Provisional Patent Application Ser. No. 63/021,869, filed on May 8, 2020 and entitled Rapid Recovery Grapple and Aquatic Vehicle Anchor, the entirety of which is hereby incorporated by reference.

BACKGROUND OF THE INVENTION

1. Field of the Invention

The present invention relates in general to the field of recovery materials used to recover items that are submerged in water, such as vehicles that enter a body of water and are submerged therein. More particularly, the present invention relates to a grapple hook that can quickly and easily be used to engage with a portion of the item, such as a wheel spoke of a tire, after which the item can quickly and easily be removed from the body of water.

2. Discussion of the Related Art

As is known to those skilled in the art, it can be difficult to remove submerged items from a body of water. This is especially true when the submerged item is exceedingly heavy. For instance, when a vehicle such as a car, van, truck, or the like is submerged in a body of water after an accident has occurred, it can be difficult to get that vehicle out of the water. Traditionally, various hooks, ties, ropes, winches, and the like were used to engage with a portion of the vehicle and then remove the vehicle from the water. However, these oftentimes did not securely connect to the vehicle, or required significant efforts by an installing individual to secure these to the vehicle, particular considering the attachment typically occurs in adverse conditions, including at extreme depths and where the item is buried in mud, snow, and other elements that may make normal attachment points inaccessible. These could be manually attached by a diver, or a surface pole and camera could be used. Further still, given these adverse conditions, the attachment process can be very dangerous. While automated means of attachment may be desired, it is very difficult to attach traditional hooks and lines at these depths, especially where there is limited or no visibility. As a result, a new system is desired that can quickly and easily be secured to the vehicle, regardless of the configuration of that vehicle.

What is needed therefore is a system that can quickly and easily be installed relative to a submerged item. What is further needed is a system that can quickly and easily be engaged with the submerged item to allow the item to be safely extracted, after which the system can be removed.

SUMMARY AND OBJECTS OF THE INVENTION

By way of summary, the present invention is directed to a rapid recovery grapple for use to remove items, such as vehicles, that are submerged in a body of water. The grapple may include a body and at least one folding finger. The at least one folding finger may be rotatably attached to the body, and the at least one folding finger may rotate relative to the body to engage with the item. Additionally, the at least one folding finger may include a first folding finger and second folding finger. Further still, the grapple may include at least one pin associated with the at least one folding finger. Additionally, the grapple may include an elastic cord, where the elastic cord automatically deploys the finger to a given position. Also, the grapple may include an opening that is formed in the body with a winch line secured within the opening.

In accordance with an aspect of the invention, both of the folding fingers may be pivotable between a first position and a second position. In the first position, the first folding finger and the second folding finger may extend parallel to one another. In the second position, the first folding finger and the second folding finger may extend angularly away from one another. For instance, in the first position, the first folding finger and the second folding finger may extend at an angle of approximately 90 degrees relative to the body. In the second position, the first folding finger and the second folding finger may extend at an angle of approximately 45 degrees relative to the body. The folding fingers may be movable from the first position before the first and second folding fingers are engaged with a wheel spoke of a vehicle, to the second position where the first folding finger and the second folding finger are pressed against the wheel spoke, to the first position again once the first folding finger and the second folding finger clear the wheel spoke. At the final stage, the first folding finger and the second folding finger engage with an inner side of the wheel spoke in order to remove the vehicle from a body of water.

In accordance with another aspect of the invention, a method of using the rapid recovery grapple is provided. Initially, the rapid recovery grapple is placed adjacent to an item, after which the grapple can be engaged with the item, and then the item may be moved using the grapple. Additionally, the method may include the steps of pivoting at least one folding finger relative to a body of the rapid recovery grapple in a first position. Next, the main body and the folding finger clear an opening in the item, after which the at least one folding finger pivots in a second direction opposite the first direction. Thereafter, the at least one folding finger engages with a portion of the item. Additionally, the grapple may be placed adjacent to a wheel spoke of a vehicle, after which the at least one folding finger is pivoted away from the wheel spoke while the main body is inserted through the opening, and then the at least one folding finger pivot back to an initial position once the at least one folding finger clears the opening. Once engaged, a winch attached to the main body may be used to remove the vehicle from a body of water.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
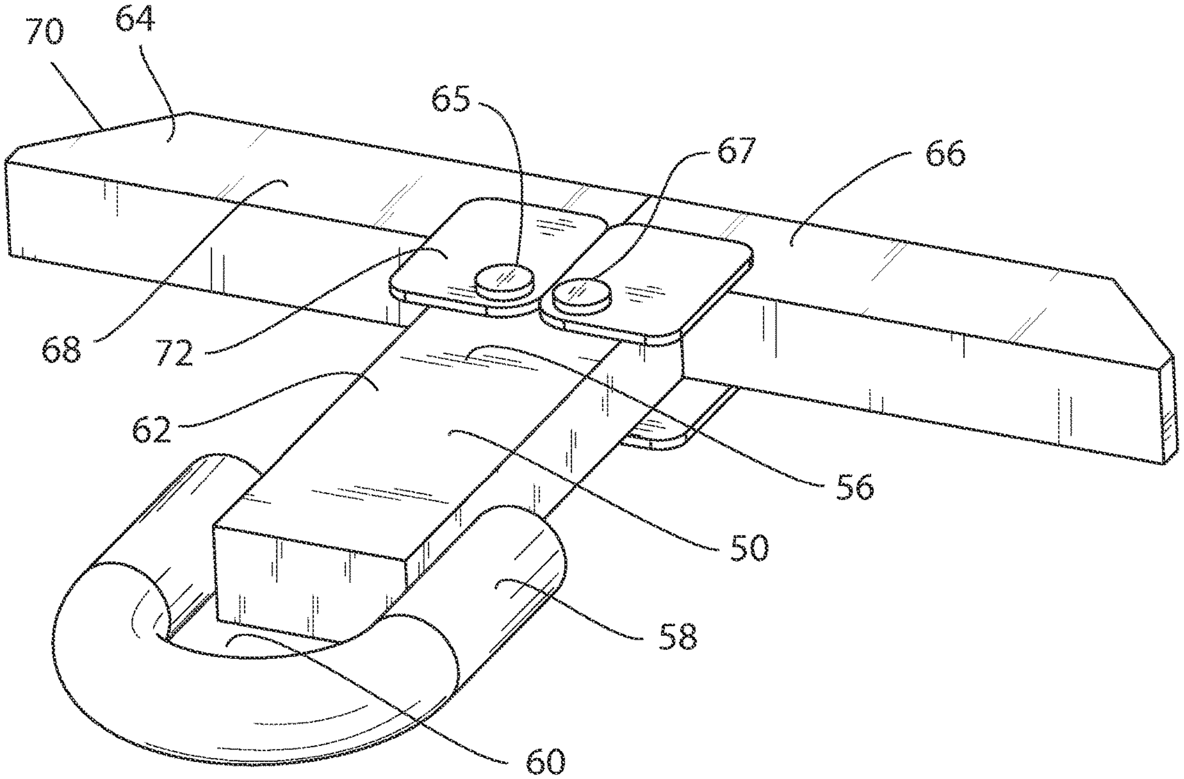
FIG. 1 illustrates an isometric view of an inventive grapple hook.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The invention is a rapid recovery grapple that is a hook designed to aid in underwater vehicle and other device recovery. It is simple for a diver or small remote operated vehicle to insert the grapple, which is attached to a winch line, rope, or the like, into the wheel spoke of a car or truck. Once inserted, the car, truck, or other device can be towed or pulled to the surface of the body of water. This device will also work on the surface for standard vehicle extractions and tow jobs.

The grapple may be an automatic or manual locking grapple that can quickly and simply be attached and locked to a tow line on a submerged vehicle. The grapple includes a main body with an opening or clevis attachment hole, as well as folding fingers with pins and an elastic or other cord that automatically deploys the fingers once inserted. The pins may be high tensile pins, where the fingers fold back on the pins against the main body to allow for insertion into a vehicle wheel. Once inserted, the cord deploys the fingers out, for instance to a 90 degree angle, which secures the grapple behind the wheel. The lengths of the fingers can vary depending on the wheel in which the grapple is to be secured. The fingers may be sprung open without using conventional springs, because conventional springs such as steel springs may be vulnerable to snagging and can also prevent insertion. Ideally, the device is compact and small enough to fit in most wheel spokes. The present device is beneficial in that it is easy to attach, it will fit in small holes, it will not fall out because it will be manually folded to extract, and it does not require an individual to crawl under a vehicle.

2. Detailed Description of Preferred Embodiments

Referring now to FIGS. 1-8, an inventive rapid recovery grapple 50 is shown. The rapid recovery grapple 50 is configured to quickly and easily be secured to a device in order to move that device. For instance, the rapid recovery grapple 50 may be secured to a vehicle 52, and more particularly, a wheel spoke 54 of a vehicle 52. For instance, when the vehicle 52 is submerged in a body of water, the rapid recovery grapple 50 can be secured to the wheel spoke 54, after which a winch system or other device that is attached to the rapid recovery grapple 50 can be pulled to move the vehicle 52 out of the body of water. Further still, the rapid recovery grapple 50 advantageously can be easily secured to the wheel spoke 54, for instance using a ROV, such that divers are either not needed, or can be located at a safe distance from the submerged vehicle 52. Each component of the rapid recovery grapple 50 is made of durable materials to help ensure that it can withstand the significant weight associated with the towing and removal of a submerged item, such as a vehicle 52. While a grapple 50 having the same shape and dimensions is shown throughout the figures, the present invention is not limited in terms of potential shapes or dimensions. Additionally, while the grapple 50 is described as being secured to a wheel spoke 54, the grapple 50 could similarly be attached to other portions of a vehicle. Further still, the grapple 50 could be secured to virtually any other object that needs to be moved.

The rapid recovery grapple 50 will now be further described. The rapid recovery grapple 50 includes a body 56. As shown in FIGS. 1-5, the body 56 is substantially rectangular 62 in shape, with a circular end 58 with an opening 60 formed therein. The circular end 58 may be formed with the body 56, otherwise, it can be welded to the body 56 or secured to the body 56 in any other way. Additionally, the body 56 may have additional openings (not shown) formed in the substantially rectangular portion 62. Other components may be pivotably secured to the body 56 using these openings. Of course, the body 56 could take any number of different dimensions, shapes, or configurations while performing the same or similar functions.

For instance, the rapid recovery grapple 50 may include at least one folding finger, and as shown, a first folding finger 64 and a second folding finger 66 that may be rotated relative to the body 56, where the first folding finger 64 rotates relative to the body about a pin 65 extending therethrough, and the second folding finger 66 rotates relative to the body about a pin 67 extending therethrough. Still looking to FIGS. 1-5, the fingers are substantially L-shaped, where there is a base portion 68 with a pointed end 70, and a reinforced connection section 72 that connects to or extends from the body 56. As shown, the base portion 68 and the connection section 72 are welded together, but they could similarly be manufactured together or otherwise later assembled. Of course, the fingers 64, 66 could take any number of additional configurations, including different dimensions, shapes, or configurations.

Figure 2:
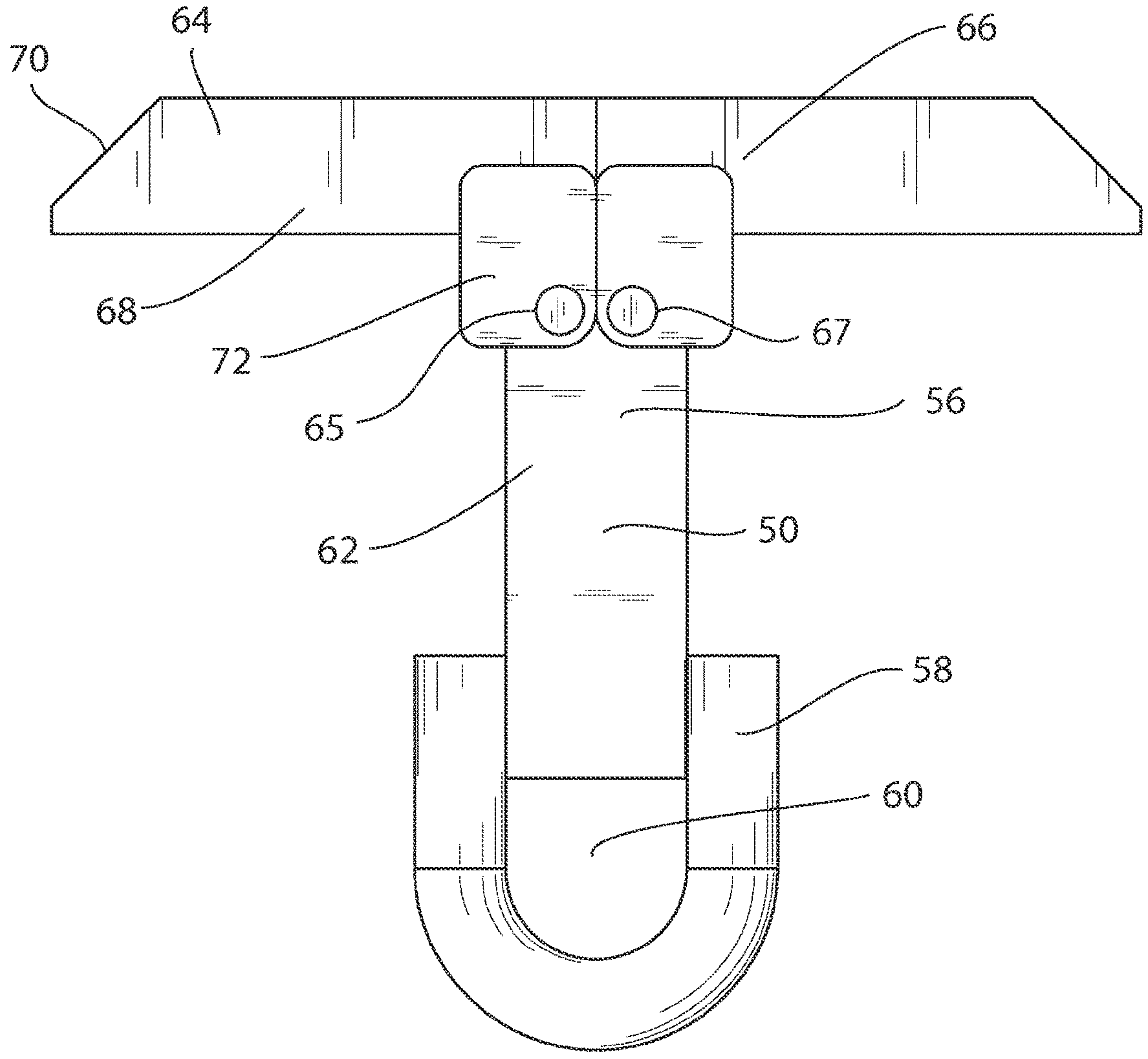
FIG. 2 illustrates a front elevation view of the inventive grapple hook of FIG. 1.
Figure 3:
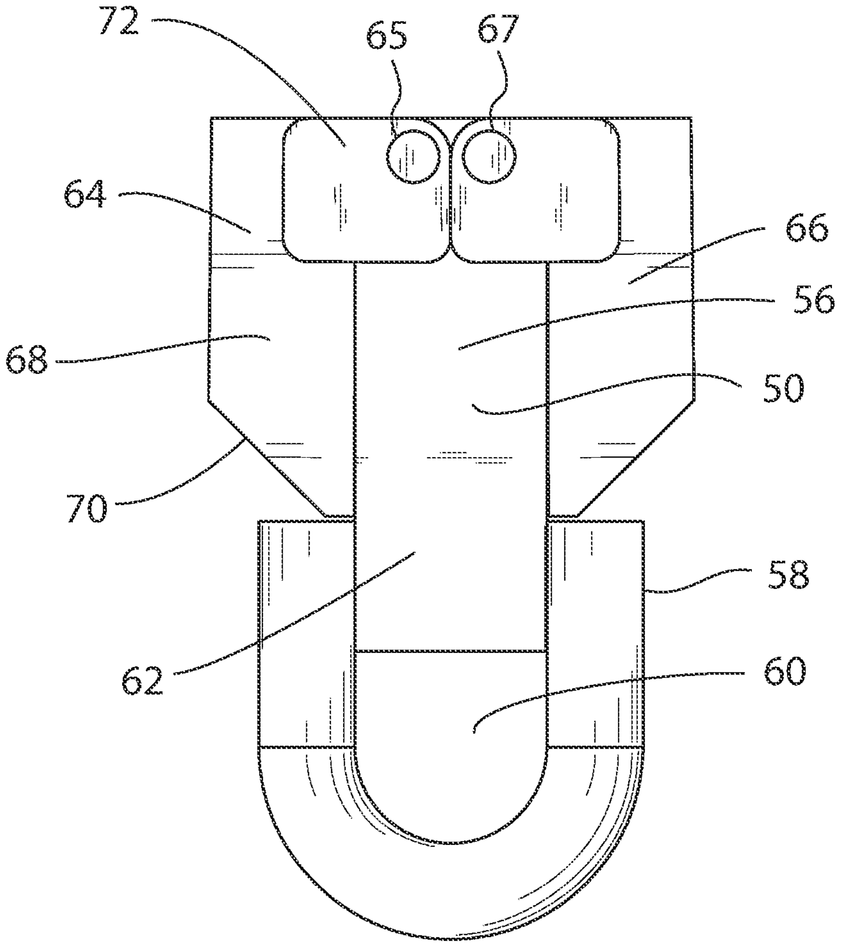
FIG. 3 illustrates a front elevation view of the inventive grapple hook of FIGS. 1 and 2 in a folded configuration.
Figure 4:
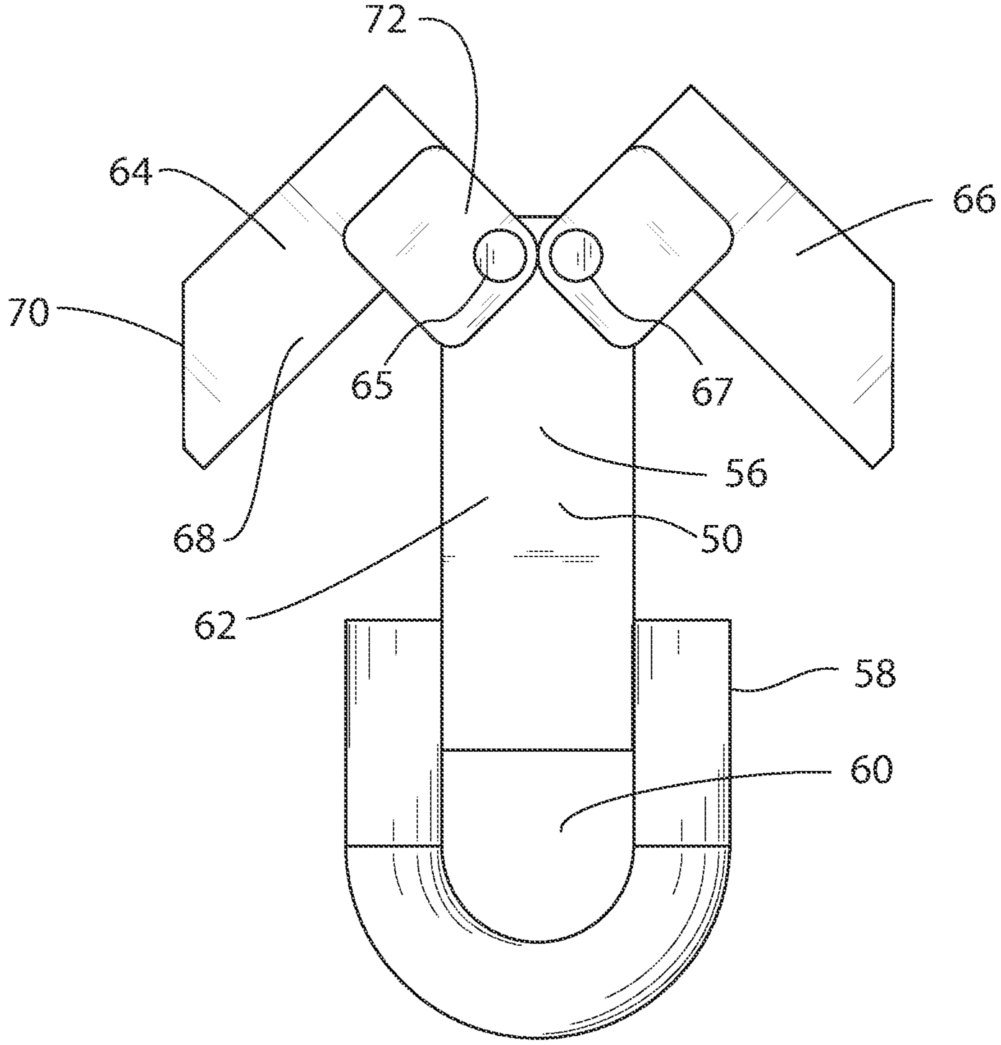
FIG. 4 illustrates a front elevation view of the inventive grapple hook of FIGS. 1-3 in a semi-folded configuration.

The fingers 64, 66 can be rotated relative to the body 56 to a number of different positions or configurations. As shown in FIG. 2, the rapid recovery grapple 50 may be shown in a first position, wherein the first folding finger 64 and the second folding finger 66 extend substantially parallel with one another, and substantially perpendicular to the body 56. As shown in FIG. 3, the rapid recovery grapple 50 may be in another position wherein the first folding finger 64 and the second folding finger 66 are rotated relative to the body 56, such that the folding fingers 64, 66 extend substantially parallel to one another, as well as the body 56. Additionally, the fingers 64, 66 may fold into a number of intermediate configurations, including the position shown in FIG. 4, where the folding fingers 64, 66 rotate to an angle of approximately 45 degrees relative to the body 56.

Figure 5:
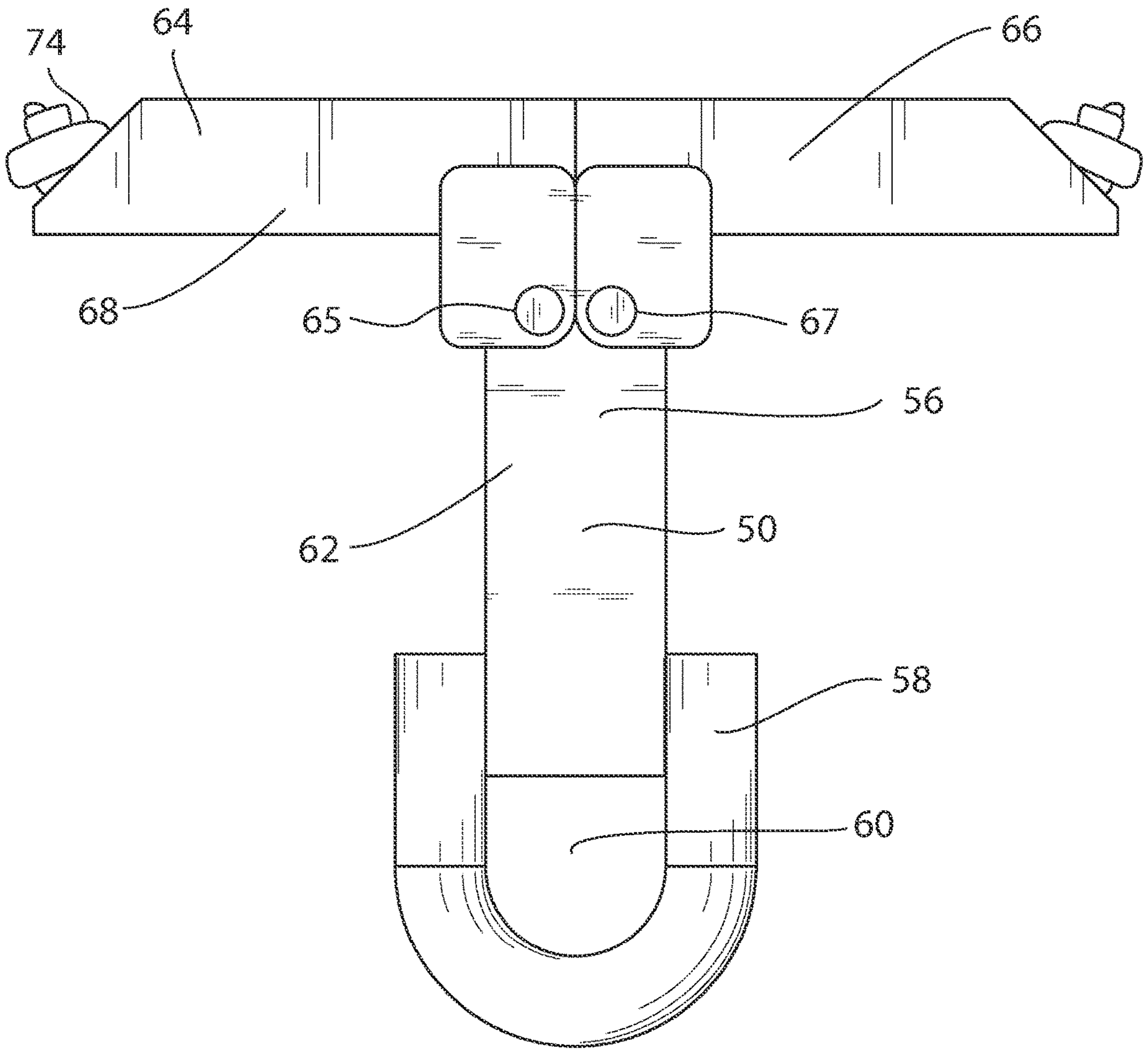
FIG. 5 illustrates a front elevation view of the inventive grapple hook of FIGS. 1-4 with a tie.
Figure 6:
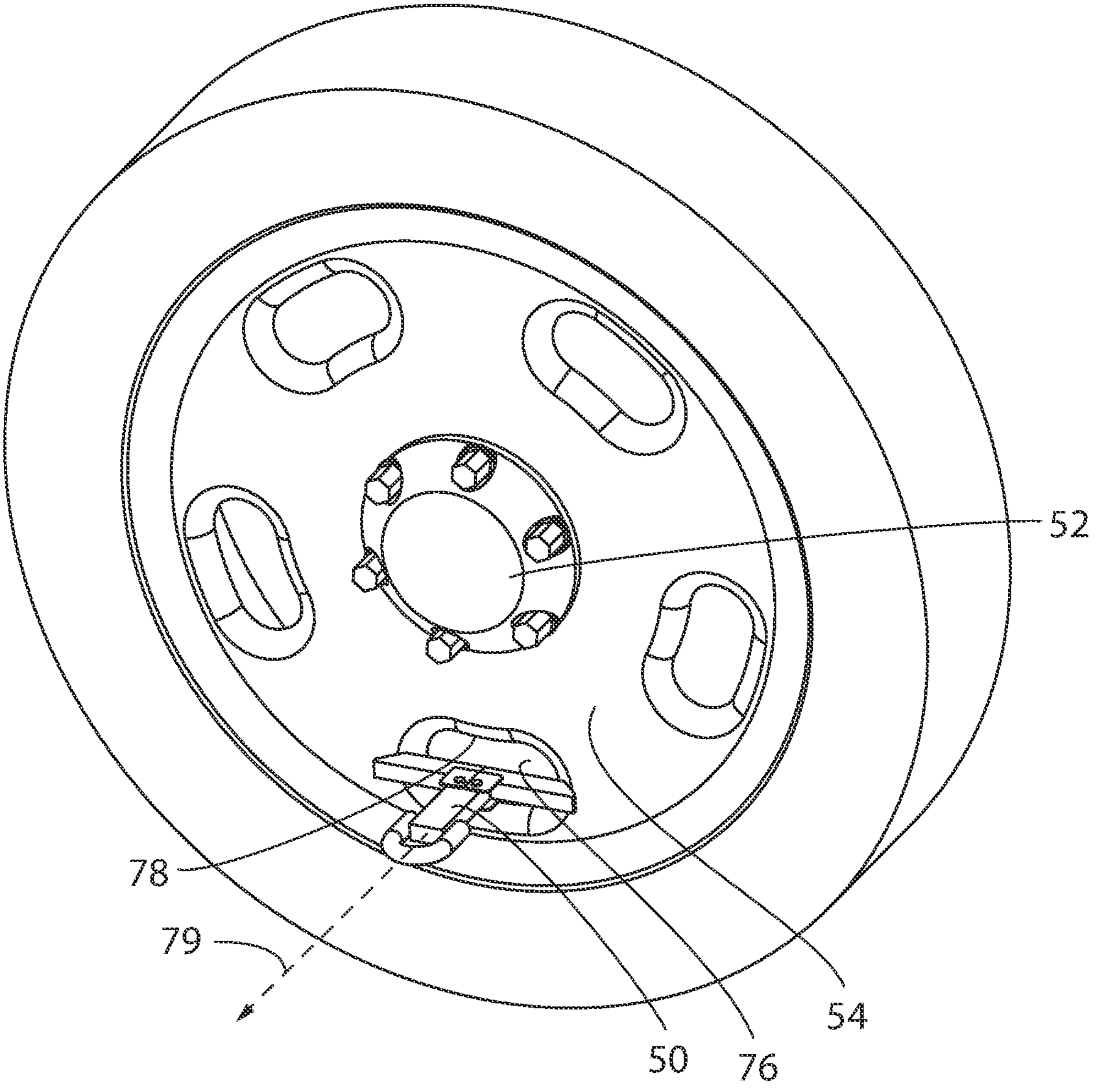
FIG. 6 illustrates an isometric view of the inventive grapple hook of FIGS. 1-4 in an extended configuration adjacent to a tire prior to installation.
Figure 7:
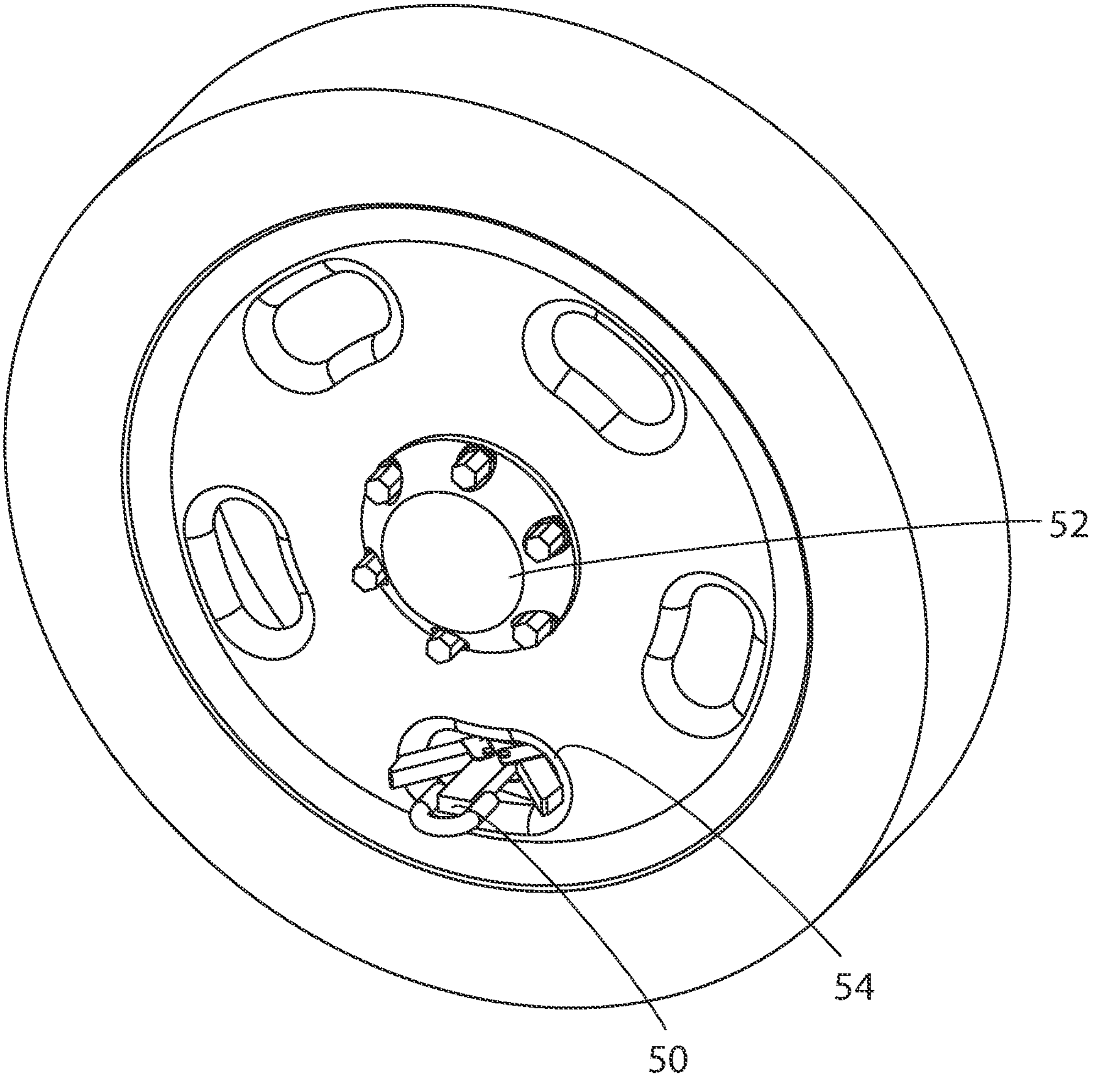
FIG. 7 illustrates an isometric view of the inventive grapple hook of FIG. 6 in an semi-folded configuration while it is being installed to the tire.
Figure 8:
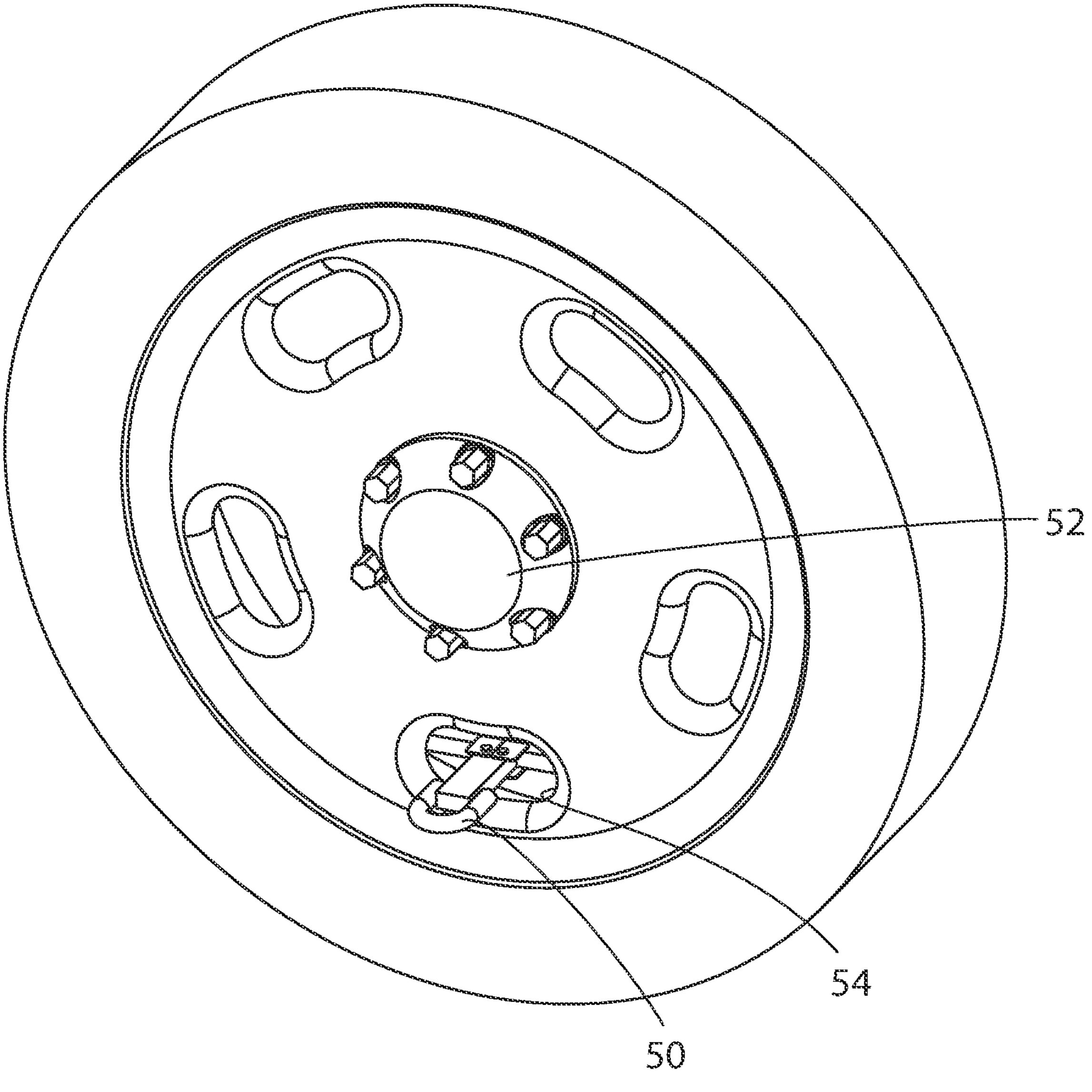
FIG. 8 illustrates an isometric view of the inventive grapple hook of FIGS. 6 and 7 in an extended configuration after it is installed to the tire.

Additionally, the grapple 50 may include a cord or other device 74 that is used to help with movement of the fingers 64, 66 relative to the body 56. For instance, as shown in FIG. 5, an elastic cord 74 may extend between the fingers 64, 66. More specifically, the elastic cord 74 may extend from the pointed ends 70 of each finger 64, 66. As a result, the elastic cord 74 automatically biases the fingers 64, 66 back toward the first position. That said, the elastic cord 74 also allows the fingers 64, 66 to be moved from the first position to other positions, although the elasticity will cause the cord 74 to continually move back toward the first position. As seen in FIGS. 6-8, this allows the fingers 64, 66 to pivot to enable the grapple 50 to be inserted into the wheel spoke 54, after which the cord 74 moves the fingers 64, 66 back to the first position, as will further be described below. Of course, the elastic cord 74 may be replaced with any other component capable of automatically biasing the fingers 64, 66 to the first position, while still allowing for rotational movement relative to the body 56. For instance, various springs may be used. That said, some traditional springs may be less desirable because they are vulnerable to snagging and can prevent successful insertion.

Use of the rapid recovery grapple 50 will now be described. Looking initially to FIG. 6, the grapple 50 is moved in close proximity to the wheel spoke 54. The grapple 50 may be located there by use of an individual, such as a diver, or by a machine, such as an ROV (remote operated vehicle). In some embodiments, movement of the grapple 50 may preferably be enabled by use of a machine as this is generally safer than by placement by a user. Initially, the fingers 64, 66 are in the first position, and typically, the grapple 50 is configured to have the fingers 64, 66 automatically bias to this position. For instance, this automatic bias may be achieved by the cord 74. Thereafter, the grapple 50 is moved directly adjacent to an opening 76 surrounded by a continuous sidewall 78 in the wheel spoke 54. Because of the size of the openings 76, and the location of the sidewalls, the fingers 64, 66 automatically rotate relative to the body 56 away from the sidewall 78 as can be seen in FIG. 7. This occurs in order to provide sufficient clearance of the body 56 and fingers 64, 66 relative to the opening 76. Once the fingers 64, 66 have passed the sidewall 78 and clear the opening 76, the fingers 64, 66 automatically bias outwardly back to the initial position due to the cord 74, as shown in FIG. 8. Once this occurs, as the circular end 58 is pulled away, the fingers 64, 66 engage with the inner surface of the sidewalls. Thus, when a winch, line, or other device pulls the circular end 58 as shown by phantom line 79, in turn the wheel spoke 54 is pulled. As a result, a submerged item, such as a vehicle 52, can be removed from a body of water, despite the significant weight associated therewith. Of course, the steps of the method could be done in any order, and some steps need not be performed.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the illustrations provide exemplary grapple and anchor devices, and the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A method of using a rapid recovery grapple comprising the steps of:

placing the rapid recovery grapple adjacent to a wheel spoke of a vehicle;

moving at least one folding finger of the rapid recovery grapple relative to the item;

pivoting the at least one folding finger relative to a main body of the rapid recovery grapple in a first direction away from the wheel spoke while the main body is inserted through the opening;

clearing the main body and folding finger through an opening in the wheel spoke;

pivoting the at least one folding finger in a second direction opposite the first direction back to an initial position once the at least one folding finger clears the opening;

engaging the rapid recovery grapple with the wheel spoke; and moving the wheel spoke using the rapid recovery grapple.

2. The method of claim 1, further comprising the step of activating a winch attached to the main body to remove the vehicle from a body of water.

3. The method of claim 1, wherein the at least one folding finger comprises a first folding finger and a second folding finger.

4. The method of claim 3, further comprising the step of pivoting the first folding finger and the second folding finger between the initial position and a second position.

5. The method of claim 4, wherein in the initial position, the first folding finger and the second folding finger extend parallel with one another; and wherein in the second position, the first folding finger and the second folding finger extend angularly away from one another.

6. The method of claim 5, wherein in the initial position, the first folding finger and the second folding finger extend at an angle of approximately 90 degrees relative to the main body.

7. The method of claim 6, wherein in the second position, the first folding finger and the second folding finger extend at an angle of approximately 45 degrees relative to the main body.

8. The method of claim 7, further comprising the steps of moving the first folding finger and the second folding finger from:

the initial position before the first folding finger and the second folding finger are engaged with a wheel spoke of a vehicle; to the second position where the first folding finger and the second folding finger are pressed against the wheel spoke; and then to the initial position once the first folding finger and the second folding finger clear the wheel spoke; and engaging the first folding finger and the second folding finger with an inner side of the wheel spoke in order to remove the vehicle from a body of water.

* * * * *